Patented July 23, 1935

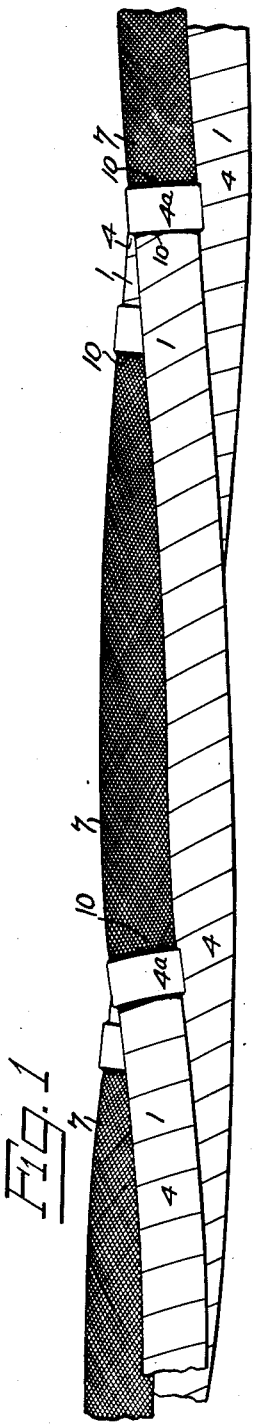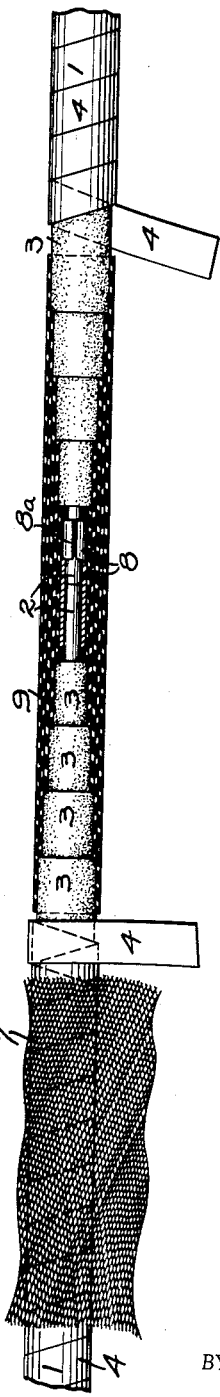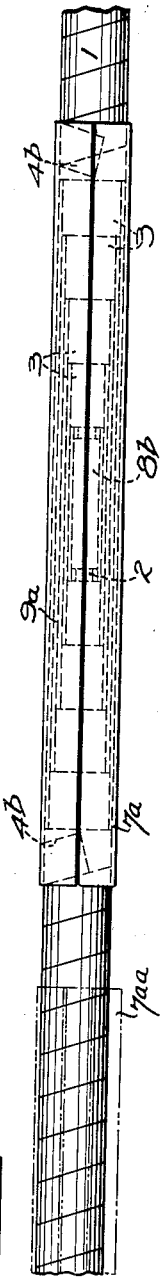
INVENTOR.
Russell E. Green
BY
Gerald J. Baldwin
ATTORNEY.

2,008,756

UNITED STATES PATENT OFFICE 2,008,756

METHOD OF JOINING CONDUCTOR UNITS IN ELECTRIC CABLES

Russell E. Green, Detroit, Mich.

Application December 7, 1933, Serial No. 701,358

1 Claim. (Cl. 173—268)

This invention relates to improvements in methods of joining conductor units in electric cables, and refers primarily to joints for conductor units in high tension cables. Such cables usually contain a plurality of conductors each of which is separately encased in insulation around which a metallic foil or sheathing is wound. The term "conductor unit" is herein employed to designate a conductor wrapped in insulation and the latter wound in metallic foil.

It is an object of the invention to provide a method of joining the opposed ends of two conductor units wherein a substantially cylindrical metallic stocking is placed around one conductor unit before the extremities of the conductors thereof are joined, so that after fresh insulation has been wrapped around the conductor joint this stocking may be readily moved into position thereover; the stocking ends are then connected to the adjacent ends of the metallic foil.

Another object of the invention is to provide such a method of joining conductor units wherein the annular metallic stocking is slipped easily over the foil from the extremity of one of the units before the two conductor extremities are joined, and, after the conductor joint has been freshly insulated, the stocking is shaped to fit snugly over this fresh insulation and is then secured to the ends of the foil on the two joined conductor units.

Having thus briefly and broadly stated the major objects of the invention I will now describe two preferred ways in which the invention is performed with the aid of the accompanying drawing, in which:

Figure 1 illustrates three conductor units which have been joined.

Figure 2 shows two conductor unit extremities with the foil partially removed, a stocking around one unit, the conductor extremities butted and held together by a sleeve, and fresh insulation around the joined conductors.

Figure 3 shows a modified method of making such a joint.

Referring to the drawing, 1 designates a plurality of conventional conductor units each consisting of conductors 2 around which a plurality of ply of insulation 3 is wrapped, and 4 is an outer covering of spirally wound conducting metallic foil or sheathing, made of electric and heat conducting material. These units are arranged close to one another so that they may be enclosed within a relatively small lead casing—not shown, and so that portions of the metallic foil of all the units may be in continuous contact with the casing.

I will now describe my method of making a joint at adjacent extremities of two conductor units. I first place a cylindrical metallic stocking 7, or 7a, around one of the conductor units. This stocking, which is made of electric and heat conducting material, preferably copper, is, in the case of the stocking 7, made of woven wire and open at both ends so that its diameter may be increased and its length decreased by pressing its ends together, or its length increased and its diameter decreased by pulling its ends. Thus the stocking 7 may be readily slipped over the foil of one of the units and subsequently drawn tightly over a joint in a manner hereinafter described.

The stocking 7 is placed around one of the units 1 far enough from its extremity to permit removal of the foil 4 from that unit extremity for an appreciable distance so as to leave ample room for stripping the insulation 3 progressively in layers as shown in Figure 2. After the foil 4 and insulation 3 having been sufficiently removed from the two unit extremities, the ends of the conductors 2 are butted together and around them a connecting sleeve 8 is secured as by solder. To insure a satisfactory joint I prefer that the sleeve 8 be longitudinally split so as to permit free passage of the solder to the contiguous conductor extremities, after which the split portion of the sleeve is also filled with solder as shown at 8a.

Layers of fresh insulation 9 are then wrapped around the conductor joint to build up the required thickness so that the safety factor of the unit is in no wise impaired. Here it may be noted that owing to the insertion of the sleeve 8 the outer circumference of the outer layer of insulation 9 is somewhat greater than that of the outer layer of original insulation 3, and for that reason I prefer to stagger the joints as shown in Figure 1 wherever it is practical to do so.

The stocking 7 is then slipped into position over the entire length of fresh insulation 9 and its ends are pulled until it fits snugly therearound. The ends of the foil 4 on the two joined conductor unit extremities are cut off to leave sufficient material to wrap over the adjacent ends of the stocking as shown at 4a. These foil ends are then secured in position by means of solder, shown at 10.

In the modification shown in Figure 3 an open-ended tubular stocking 7a, having an annular wall which is preferably longitudinally split, is slipped over the foil 4 from one extremity of one of the units to be joined into the position shown at 7aa. After the two conductors have been connected by a sleeve 8b and new insulation 9a wound around the joint in the manner hereinbefore described, the stocking 7a is moved into position and squeezed around the said insulation 9a. In this case the adjacent ends 4b of the foil are inserted within the extremities of the stocking before the latter is squeezed around the new insulation.

It will be noted that while it is possible to space the conductor units 1 somewhat from one another so that the new insulation can be applied, it would be a tedious and awkward operation to re-wind the foil 4 over the joint particularly since the edges of the foil are sharp and would cut the operator's fingers. It is therefore obvious that the stocking 7, or 7a may be much more expeditiously applied.

While in the foregoing the preferred embodiments of the invention have been described and shown, it is understood that the invention is susceptible to such further modifications as fall within the scope of the appended claim.

What I claim is:

A cable comprising two units arranged in end to end relationship and each having a conductor, an insulation around the conductor and a sheathing formed of a metallic foil wound around the insulation, the adjacent ends of the units both having the insulation and the metallic foil around them removed, means connecting the adjacent bared ends of the conductors, insulation applied around the joined conductors, and a woven cylindrical metallic stocking so formed that when its ends are pulled its diameter decreases to tighten itself around the applied insulation, the extremities of the metallic foil being first tightly wrapped around and thereafter permanently secured to the ends of the stocking.

RUSSELL E. GREEN.